US008775844B1

(12) United States Patent
Peterson

(10) Patent No.: US 8,775,844 B1
(45) Date of Patent: Jul. 8, 2014

(54) DYNAMIC INFORMATION ADAPTATION FOR A COMPUTING DEVICE HAVING MULTIPLE POWER MODES

(71) Applicant: Google Inc., Mountain View, CA (US)

(72) Inventor: Morten Just Peterson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/049,004

(22) Filed: Oct. 8, 2013

Related U.S. Application Data

(60) Provisional application No. 61/871,744, filed on Aug. 29, 2013.

(51) Int. Cl.
*G06F 1/32* (2006.01)

(52) U.S. Cl.
CPC .................................... *G06F 1/3287* (2013.01)
USPC .......................................... 713/323; 725/105

(58) Field of Classification Search
USPC ......... 713/1, 2, 100, 300, 310, 320, 321, 322, 713/323, 324, 330, 340, 375
See application file for complete search history.

(56) References Cited

U.S. PATENT DOCUMENTS

| 7,565,676 | B2* | 7/2009 | Bell | 725/105 |
|---|---|---|---|---|
| 2005/0210300 | A1* | 9/2005 | Song et al. | 713/300 |
| 2008/0059921 | A1* | 3/2008 | Esliger et al. | 716/4 |
| 2010/0062725 | A1* | 3/2010 | Ryu et al. | 455/69 |

OTHER PUBLICATIONS

"Using custom HTML Tags," Stack Overflow [online]. May 11, 2011. Retrieved from the Internet: <http://stackoverflow.com/questions/5970093/using-custom-html-tags> 3 pgs.
"Media Queries," W3C [online]. Jun. 19, 2012. Retrieved from the Internet: <http://www.w3.org/TR/css3-mediaqueries/> 25 pgs.
"About Microformats," Microformats [online]. First Accessed on May 23, 2013. Retrieved from the Internet: <http://microformats.org/about> 3 pgs.
Marcotte, "Responsive Web Design" [online]. May 25, 2010. Retrieved from the Internet: <http://alistapart.com/article/responsive-web-design> 9 pgs.

* cited by examiner

*Primary Examiner* — Kim Huynh
*Assistant Examiner* — Paul J Yen
(74) *Attorney, Agent, or Firm* — Shumaker & Sieffert, P.A.

(57) ABSTRACT

A computing device is described that can detect a change to a power mode of the computing device and responsive to detecting the change, identify, from among a set of elements that each specify respective content in accordance with a markup language, one or more elements that each have at least one respective attribute associated with the power mode of the computing device. The computing device can modify, based on the change to the power mode, at least a portion of the respective attribute of each of the identified one or more elements to associate the respective content specified by each of the identified elements with a set of presentation properties. The computing device can render, for display in accordance with the set of presentation properties, the respective content specified by each element from the set of elements.

20 Claims, 6 Drawing Sheets

DYNAMIC INFORMATION ADAPTATION FOR A COMPUTING DEVICE HAVING MULTIPLE POWER MODES

This application claims the benefit of U.S. Provisional Application No. 61/871,744, filed Aug. 29, 2013, the entire content of which is hereby incorporated by reference.

BACKGROUND

Some computing devices may operate in different power modes depending on various conditions. For instance, a computing device may operate in a full-power mode when the computing device determines that the computing device is currently being used by a user. In full-power mode, some computing devices may perform power-intensive functions, such as powering all processors, powering all peripherals, etc. Conversely, to conserve electrical power (e.g., when relying on battery power), a computing device may operate in a low-power mode after determining that the device is not currently being used. In low-power mode, some computing devices may turn-off some processing functions, turn-off some peripherals, etc. When presenting information at a display, some computing devices may present the information with different display characteristics (e.g., brightness, contrast, resolution, pixel density, etc.) depending on whether the devices are operating in full-power mode or low-power mode.

There is an ever-increasing demand on computing devices, including mobile computing devices, to output, for display, richer and more complex types of content. Presenting richer and more complex content can present some unique challenges for some computing devices, such as computing devices that can operate in different power modes under different operating conditions.

SUMMARY

In one example, the disclosure is directed to a method that includes detecting, by a computing device, a change to a power mode of the computing device, and responsive to detecting the change, identifying, by the computing device and from among a set of elements that each specify respective content in accordance with a markup language, one or more elements that each have at least one respective attribute associated with the power mode of the computing device. The method further includes modifying, by the computing device and based on the change to the power mode, at least a portion of the respective attribute of each of the identified one or more elements to associate the respective content specified by each of the identified elements with a set of presentation properties. The method further includes rendering, by the computing device and for display in accordance with the set of presentation properties, the respective content specified by each element from the set of elements.

In another example, the disclosure is directed to a computing device that includes a display device, at least one processor, and at least one module operable by the at least one processor to detect a change to a power mode of the computing device. Responsive to detecting the change, the at least one module is further operable by the at least one processor to identify, from among a set of elements that each specify respective content in accordance with a markup language, one or more elements that each have at least one respective attribute associated with the power mode of the computing device. The at least one module is further operable by the at least one processor to modify, based on the change to the power mode, at least a portion of the respective attribute of each of the identified one or more elements to associate the respective content specified by each of the identified elements with a set of presentation properties, and render, for display in accordance with the set of presentation properties, the respective content specified by each element from the set of elements.

In another example, the disclosure is directed to a computer-readable storage medium encoded with instructions that, when executed, cause at least one processor of a computing device to detect a change to a power mode of the computing device, and responsive to detecting the change, identify, from among a set of elements that each specify respective content in accordance with a markup language, one or more elements that each have at least one respective attribute associated with the power mode of the computing device. The computer-readable storage medium is further encoded with instructions that, when executed, cause the at least one processor of the computing device to modify, based on the change to the power mode, at least a portion of the respective attribute of each of the identified one or more elements to associate the respective content specified by each of the identified elements with a set of presentation properties, and render, for display in accordance with the set of presentation properties, the respective content specified by each element from the set of elements.

The details of one or more examples are set forth in the accompanying drawings and the description below. Other features, objects, and advantages of the disclosure will be apparent from the description and drawings, and from the claims.

DETAILED DESCRIPTION

Figure 1:
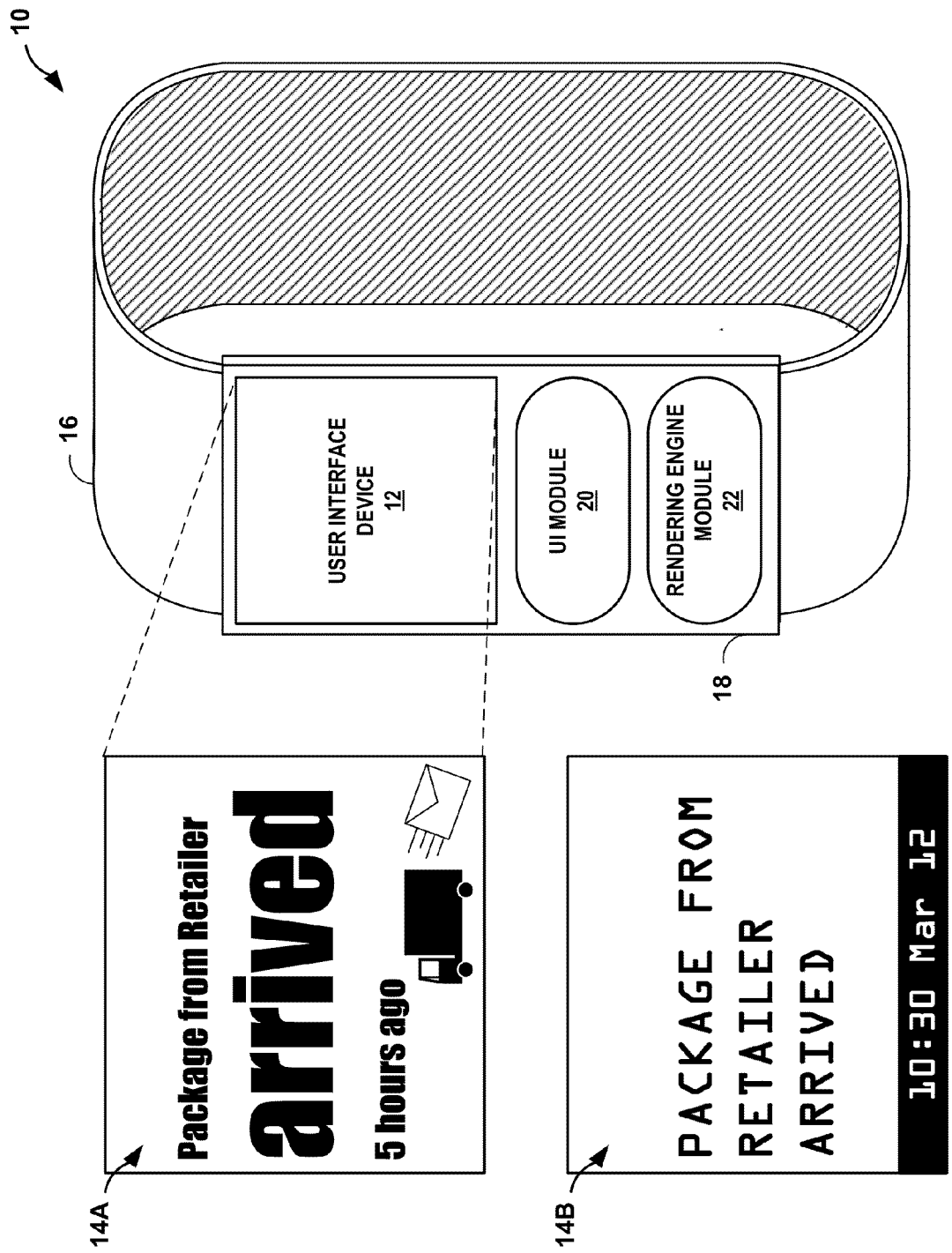
FIG. 1 is a conceptual diagram illustrating an example computing device configured to dynamically modify content in response to a change to a power mode, in accordance with one or more aspects of the present disclosure.

In general, techniques of this disclosure may enable a computing device to dynamically format content (e.g., display data formatted in accordance with a markup language) in order to isolate portions of the content for rendering and display in accordance with a current power mode in which the computing device is operating. For example, a computing device, such as a wearable computing device, may operate in multiple power modes, including a full-power mode and a low-power mode. In full-power mode the computing device may present content at a display that is currently configured to operate with maximum display characteristics (e.g., full-resolution, full color support, full brightness, full pixel density, etc.). Some of the content that the computing device presents in full-power mode may not be suitable and/or compatible for display in low-power mode. That is, the content may include portions of information and/or have presentation characteristics (e.g., colors, font sizes, etc.) that cannot be and/or are not intended to be (e.g., by an application or developer source of the content) rendered and displayed in low-power mode when the display has been configured to operate with less than the maximum display characteristics.

In response to detecting a change from one power mode of the computing device to another, the computing device, prior to rendering the content for display, can process the content to identify any specific portions of the content (e.g., elements of the data formatted in accordance with the markup language) that have attributes associated with the current power mode of the computing device. The attributes may be specified by a source of the content (e.g., a machine and/or a human developer) to identify certain portions of the content that are to be rendered and displayed when the computing device operates in a particular power mode. Prior to rendering the content for display, the computing device may process the content and may dynamically modify one or more of the attributes to associate the identified portions of the content with a set of presentation properties that are unique to the current power mode.

In some implementations, the computing device can render and display the modified content so that the identified portions are rendered and displayed according to any unique presentation properties defined for the current power mode of the computing device. In this way, the source of the content need only identify which portions of the content are to be rendered and displayed for a given power mode, and need not specify how the content should be presented (e.g., defined by the presentation characteristics of the content) when displayed during the different power modes. As such, the computing device can automatically present only the portions of the content that are intended for and/or compatible with the current power mode. Moreover, the computing device can also automatically format and present the identified portions in accordance with display properties suitable to the current characteristics of the display given the current power mode.

FIG. 1 is a conceptual diagram illustrating computing device 10 which is configured to dynamically modify content in response to a change to a power mode, in accordance with one or more aspects of the present disclosure. In the example of FIG. 1, computing device 10 is a wearable computing device (e.g., a watch). However, in other examples, computing device 10 may be a mobile phone, a tablet computer, a personal digital assistant (PDA), a laptop computer, a portable gaming device, a portable media player, an e-book reader, a television platform, an automobile navigation system, or any other type of mobile or non-mobile computing device.

Computing device 10 may include watchband 16 and electrical housing 18. Within electrical housing 18, computing device 10 may include a user interface device (UID) 12. UID 12 of computing device 10 may function as an input device for computing device 10 and as an output device. UID 12 may be implemented using various technologies. For instance, UID 12 may function as a presence-sensitive input device using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UID 12 may function as an output device, such as a display device, using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive screen that can receive tactile user input from a user of computing device 10 and present output. UID 12 may receive indications of the tactile user input by detecting one or more tap and/or non-tap gestures from a user of computing device 10 (e.g., the user touching or pointing at one or more locations of UID 12 with a finger or a stylus pen) and in response to the input, computing device 10 may cause UID 12 to present output. UID 12 may present the output as a user interface (e.g., user interface 14A or user interface 14B) which may be related to functionality provided by computing device 10. For example, UID 12 may present various user interfaces of applications (e.g., a watch application, an electronic message application, an Internet browser application, etc.) executing at computing device 10. A user of computing device 10 may interact with one or more of these applications to perform a function with computing device 10 through the respective user interface of each application.

Computing device 10 may include user interface ("UI") module 20 and rendering engine module 22. Modules 20 and 22 may perform operations using software, hardware, firmware, or a mixture of hardware, software, and/or firmware residing in and executing on computing device 10. Computing device 10 may execute modules 20 and 22 with multiple processors. Computing device 10 may execute modules 20 and 22 as a virtual machine executing on underlying hardware. Although UID 12 and modules 20 and 22 are shown in FIG. 1 as arranged within housing 18, the techniques of this disclosure are not limited by the arrangement of the components shown in FIG. 1. For instance, in one example, computing device 10 may not include housing 18 and UID 12, UI module 20 and/or rendering engine module 22 may be arranged within watchband 16 or, in another example, UID 12 and modules 20 and 22 may be otherwise arranged remotely to electrical housing 18 and remotely accessible to computing device 10, for instance, as one or more network services via a network cloud.

Rendering engine module 22 of computing device 10 renders content for display by computing device 10. In other words, rendering engine module 22 may generate a rendering of display data (e.g., information) and send the rendering to UI module 20 to cause UID 12 to display an image of the rendering at UID 12. Rendering engine module 22 may render content of display data that includes one or more attributes and/or elements that each specify respective content in accordance with a markup language, such as hypertext markup language (HTML), extensible markup language (XML), or other types of markup languages. For instance, rendering engine module 22 may parse HTML-based display data for content bounded by elements having attributes, apply presentation properties to the content, and otherwise format the content to produce a rendering of the content for display.

UI module 20 may cause computing device 10 to present information at UID 12 and interpret inputs detected at UID 12 in response to the presentation. For example, UI module 20 may receive HTML-based display data from an application, an operating system, and/or other computing platform, executing at computing device 10. The HTML-based display data may provide instructions used by rendering module 22 for producing a rendering of user interfaces 14A and 14B. UI module 20 may send the HTML-based display data or a pointer to the location of the display data in a memory of computing device 10, to rendering engine module 22 to have rendering engine module 22 render the content of the HTML-based display data into a format that UI module 20 can use to cause UID 12 to output an image of the content (e.g., a rendering) for display. UI module 20 may cause UID 12 to output user interface 14A, user interface 14B, or another example user interface, for display and, as a user interacts with user interface presented at UID 12, UI module 20 may interpret inputs detected at UID 12 (e.g., as a user provides one or more gestures at a location of UID 12 at which user interface 14A, user interface 14B, or another example user interface is displayed). UI module 20 may relay information about the inputs detected at UID 12 to one or more associated applications, operating systems, and/or computing platforms executing at computing device 10 associated with the user interface to cause computing device 10 to perform a function.

User interfaces 14A and 14B are two examples graphical user interfaces. User interfaces 14A and 14B each include graphical indications (e.g., graphical elements, characters of text, etc.) of content displayed at various locations of UID 12. The content of user interfaces 14A and 14B, and associated presentation characteristics (e.g., the font size, smoothness, screen resolution, etc.) applied to the content, may be defined by HTML-based display data interpreted by rendering engine module 22. In the example of FIG. 1, although both user interfaces 14A and 14B include information about the arrival of a package, user interface 14A includes a greater amount of content and more complex presentation characteristics applied to the content than the content included in user interface 14B. When presenting a rendering of user interface 14A at UID 12, UI module 20 may cause UID 12 to present user interface 14A with greater presentation characteristics (e.g., increased font size/smoothness, increased resolution, full color support, greater brightness, etc.) than the presentation characteristics that UI module 20 causes UID 12 to apply to the presentation of user interface 14B.

To manage electrical power consumption, computing device 10 may operate in different power modes. For instance, in a full-power mode, computing device 10 may provide power to one or more high-power processors that consume a maximum amount of power, and may present content with maximum display characteristics at a display, such as UID 12. In a low-power mode, computing device 10 may provide power to one or more low-power processors that consume a less-than maximum amount of power and/or present content with less-than maximum display characteristics at a display. Computing device 10 may operate in full-power mode when computing device 10 determines that a user is interacting with the device (e.g., providing inputs and/or viewing content at a display) and, to conserve electrical power, operate in a low-power mode when computing device 10 determines that a user is not likely interacting with the device (e.g., not providing inputs and/or viewing content at a display).

UI module 20 may determine the power mode of computing device 10 and cause UID 12 to present a particular user interface (e.g., user interface 14A or 14B) that depends on the current power mode. UI module 20 may cause UID 12 to present user interface 14A that requires maximum presentation characteristics at UID 12 when computing device 10 operates in full-power mode and may cause UID 12 to present user interface 14B that requires less-than maximum display characteristics, at UID 12 when computing device 10 operates in low-power mode.

Some applications, operating systems, and/or computing platforms may provide multiple sets of HTML-based display data (e.g., multiple sets of HTML-based pages) to be presented at a display device, with each set corresponding to a different user interface to be displayed depending on the current power mode. Each set may have certain content and include instructions used by a rendering engine for applying specific presentation properties to the content that depend on the current power mode of the computing device and/or display device. For instance, an application that provides package tracking information may send a first HTML-based page to a rendering engine of a computing device for rendering for display when the computing device operates in a full-power mode and the application may send an additional, second, complete HTML-based page to the rendering engine for rendering for display when the computing device operates in a low-power mode. The computing device (e.g., the rendering engine) may have to manage multiple, complete sets of HTML-based pages and display data, with at least one set for each different power mode. As the computing device transitions in and out of different power modes, the computing device has to ensure the correct set of HTML-based display data or HTML-based page is displayed for that given power mode.

In contrast, rather than requiring UI module 20 to manage multiple sets of HTML-based display data, with each set corresponding to a different power mode, the techniques of this disclosure may provide capability for UI module 20 to cause rendering engine module 22 to automatically modify a single set of display data, so that only portions of content of the display data that are associated with, and/or that are compatible with the display characteristics of the current power mode, are rendered and/or displayed when computing device 10 operates in the current power mode. Only having to manage a single set of HTML-based display data for each power mode of a computing device may require fewer computing resources (e.g., processor time, memory, storage, etc.) than if the computing device has to manage multiple sets of HTML-based display data, with each set corresponding to a different power mode of the computing device.

In operation, computing device 10 may detect a change to a power mode of the computing device. The change may be detected as input from a user or, as another example, in response to computing device 10 determining to automatically to transition from a full-power mode to a low-power mode. For example, computing device 10 may operate in full-power mode in which UI module 20 may cause UID 12 to present user interface 14A based on a rendering of display data received from rendering engine module 22. While operating in full-power mode, computing device 10 may determine that a user is not interacting with computing device 10 and transition from operating in full-power mode to a low-power mode. For instance, UI module 20 of computing device 10 may determine that an activity timer associated with computing device 10 has lapsed (e.g., responsive to determining a period of time without detecting an input at UID 12) and responsive to determining that activity timer has lapsed, computing device 10 may transition to a sleep mode associated with computing device 10. In other words, computing device 10 may transition from operating in a full-power mode to begin operating in a low-power mode (e.g., a sleep mode). As another example, computing device 10 may receive an indication of a notification (e.g., a push notification from an application or service executing at computing device 10), an alert (e.g., from a weather alert or public emergency broadcast system), or other information that causes computing device 10 to transition from a low-power mode to a full-power mode to present a graphical indication of the received notification, alert, or other information at UID 12.

Responsive to detecting the change from full-power to low-power mode, UI module 20 may cause rendering engine module 22 to produce an updated rendering of the display data used to generate the rendering of user interface 14A to cause rendering engine module 22 to produce a rendering of the content of the display data that is compatible with the display characteristics of UID 12 in low-power mode. In other words, the change to a power mode of computing device 10 may be detected by UI module 20 in response to the transition to the sleep mode.

Computing device 10 may identify, from among a set of elements that each specify respective content in accordance with a markup language, one or more elements that each have at least one respective attribute associated with the power mode of the computing device. For example, in full-power mode, rendering engine module 22 may produce a rendering of HTML-based display data to produce a rendering that UID presents as user interface 14A. Responsive to detecting the change from full-power mode to low-power mode from UI module 20, rendering engine module 22 may parse the HTML-based display data for specific elements (e.g., HTML <DIV> tags), that bound portions of content in the HTML-based display data that are associated with the current (e.g., low) power mode, to produce an updated rendering of the content of the HTML-based display data that UID can present as user interface 14B.

Rendering engine module 22 may process the content to search for and identify attributes of the elements that bound portions of content in the HTML-based display data which are associated with the current (e.g., low) power mode of computing device 10. For instance, rendering engine module 22 may search for <DIV> tags which include one or more class attributes indicative low-power mode when computing device transitions to from full-power to low-power mode. Rendering module 22 may attribute the portions of content bounded by the elements that have attributes associated with the current power mode (e.g., portions of content that are tagged by the class attributes indicative of the low-power mode of computing device 10) as being portions of content associated with the current (e.g., low) power mode.

Rendering engine module 22 may modify, based on the change to the power mode, at least a portion of the respective attribute of each of the identified one or more elements to associate the respective portions of content specified by each of the identified elements with a set of presentation characteristics. For example, the HTML-based display data may reference one or more sets of presentation characteristics (e.g., identified in one or more Cascaded Style Sheets (CSS) linked to the HTML-based display data). Rendering engine module 22 may modify the HTML-based display data to apply the set of presentation characteristics associated with the low-power mode of computing device 10 to the portions of content indicated by the class attributes indicative of the low-power mode.

Rendering engine module 22 may render, for display in accordance with the set of presentation properties, the respective content specified by each element from the set of elements. In other words, rendering engine module 22 may generate a rendering of the modified HTML-based display data to produce a rendering that UI module 20 can cause UID 12 to present as user interface 14B. The rendering of user interface 14B may graphically depict portions of content from the HTML-based display data that have the class attributes indicative of the low-power mode. The rendering of user interface 14B may be rendered in accordance with a set of presentation properties (e.g., font, color, resolution, etc.) that make the rendering compatible for display at UID 12 when computing device 10 operates in low-power mode. In some examples, the set of presentation properties may be defined by one or more cascaded style sheets (CSS). UI module 20 of computing device 10 may cause UID 12 to output, for display, an indication of the rendered content by causing UID 12 to present the rendering received from rendering engine module 22.

Computing device 10 may dynamically modify the content (e.g., portions of content in display data that is formatted in accordance with a markup language) prior to rendering the content in order to isolate portions of the content for rendering and display in accordance with a current power mode in which computing device 10 is operating. In response to UI module 20 detecting a change from one power mode of computing device 10 to another, UI module 20 can cause rendering engine module 22 to render content by at least identifying portions of the content that have attributes associated with the current power mode of computing device 10. Prior to rendering the content for display, rendering engine module 22 may process the content and may dynamically modify one or more of the attributes to associate the identified portions of the content with a set of presentation properties that are unique to the current power mode. Rendering engine module 22 can render the modified content so that UI module 20 can cause UID 12 to present the identified portions according to the unique presentation properties of the current power mode.

Rather than require an application to provide multiple sets of display data for the different power modes and/or to require UI module 20 to manage these different sets of display data, the techniques of this disclosure may provide capability for computing device 10 to automatically modify display data so that only portions of content of the display data that are associated with, and/or that are compatible with the display characteristics of the current power mode, are rendered and/or displayed when computing device 10 operates in a given power mode. In this way, the source of the content need only identify which portions of the content that are to be rendered and displayed for a particular power mode, but need not specify how the content should be presented (e.g., defined by the presentation characteristics of the content) when displayed during the different power modes. Instead, computing device 10 may automatically format and present only the identified portions in accordance with display properties suitable to the current characteristics of UID 12, given the current power mode.

In some examples, the described techniques may enable a computing device to dynamically format content (e.g., display data) that is formatted in accordance with a markup language (e.g., HTML, extensible markup language (XML), etc.) in order to isolate portions of the content for rendering and display in accordance with a current power mode in which the computing device is operating. In other examples, the content is formatted in accordance with other types of document annotation languages, markup languages, programming languages, scripting languages, and/or combinations thereof, for specifying renderable content having attributes and elements that can be modified and rendered for display according to these techniques.

Figure 2:
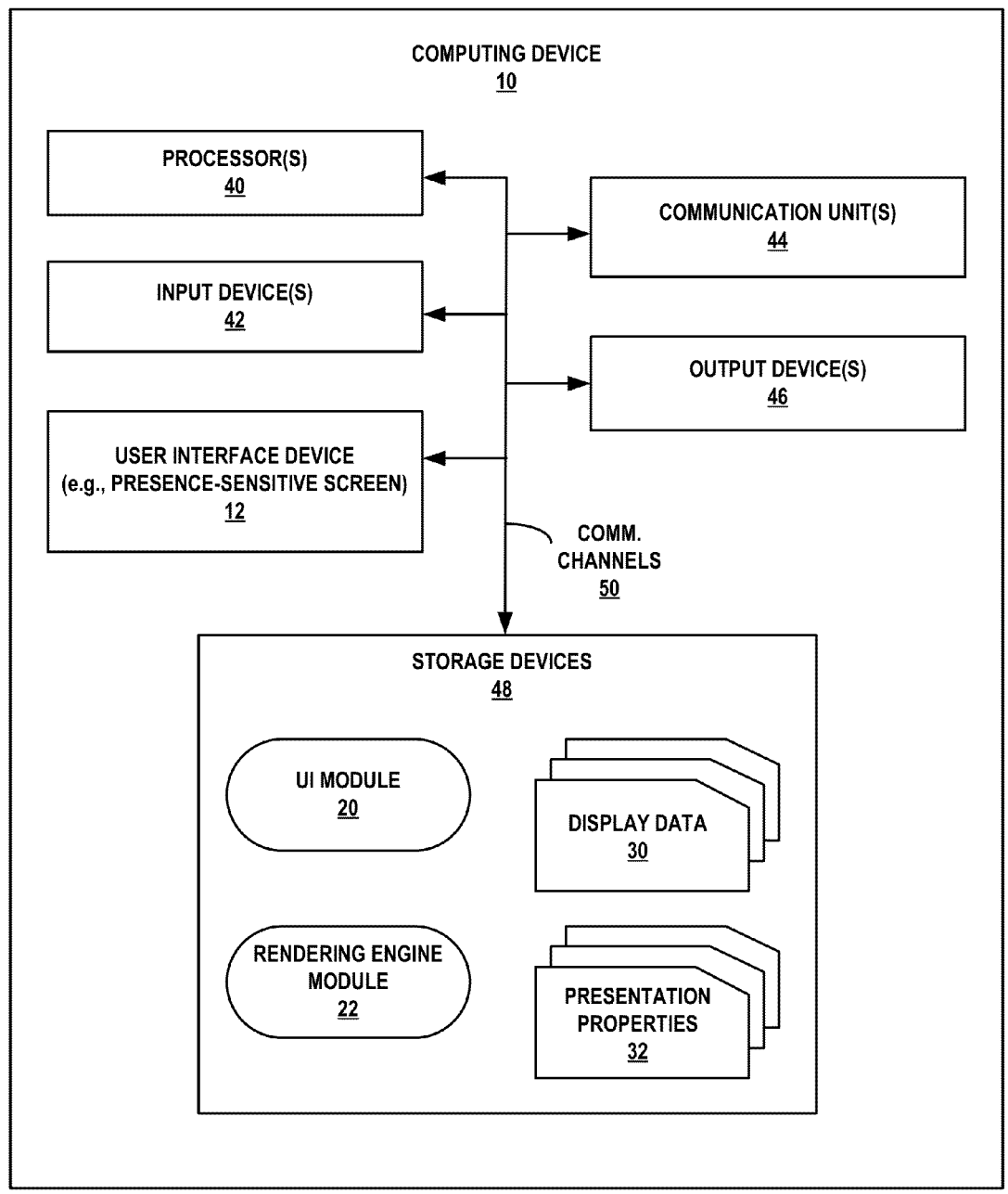
FIG. 2 is a block diagram illustrating an example computing device configured to dynamically modify content in response to a change to a power mode, in accordance with one or more aspects of the present disclosure.

FIG. 2 is a block diagram illustrating computing device 10 that is configured to dynamically modify content in response to a change to a power mode, in accordance with one or more aspects of the present disclosure. FIG. 2 illustrates only one particular example of computing device 10 and many other examples of computing device 10 may be used in other instances. In the example of FIG. 2, computing device 10 may be a wearable computing device, a mobile computing device, or a non-portable (e.g., desktop, etc.) computing device. Computing device 10 of FIG. 2 may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20 and rendering engine module 22. UI module 20 and rendering engine module 22 may rely on information stored at storage device 48 as display data 30 and presentation properties 32. In other words, as is described in more detail below, UI module 20 and rendering engine module 22 may be operable by processors 40 to perform read/write operations on information, stored as display data 30 and presentation properties 32, at storage device 48 to perform a function of computing device 10.

Communication channels 50 may interconnect each of the components 12, 20, 22, 30, 32, 40, 42, 44, and 46 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive display, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface (such as user interfaces 14A and 14B of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data accessed by modules 20 and 22 during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 20 and 22, and display data 30 and presentation properties 32.

One or more processors 40 may implement functionality and/or execute instructions within computing device 10. For example, processors 40 on computing device 10 may receive and execute instructions stored by storage devices 48 that execute the functionality of UI module 20 and rendering engine module 22. These instructions executed by processors 40 may cause computing device 10 to store information, such as display data 30 and/or presentation properties 32, within storage devices 48 during program execution. Processors 40 may execute instructions of modules 20 and 22 to cause UID 12 to render portions of content of display data 30 according to some of presentation properties 32 to present the rendered content as one of user interfaces 14A and 14B at UID 12. That is, modules 20 and 22 may be operable by processors 40 to perform various actions or functions of computing device 10, for instance, causing UID 12 to present user interfaces 14A and 14B at UID 12.

Display data 30 and presentation properties 32 are respectively, information (e.g., files) that include renderable content in accordance with a markup language and associated presentation properties that may be applied to the renderable content. For instance, display data 30 may be one or more HTML-based files that include content which rendering engine module 22 may render to create image data that UI module 20 can present at UID 12. Presentation properties 32 may be one or more CSS files referenced by display data 30 that rendering engine module 22 may use to format portions of the content of display data 30 during rendering.

Computing device 10 may detect a change to a power mode of computing device 10. For example, computing device 10 may operate in full-power mode in which computing device 10 may provide full-power to, and/or may operate with all the functionality provided by, processors 40, input devices 42, communication units 44, output devices 46, and UID 12. While in full-power mode, UI module 20 may cause UID 12 to present a rendering from rendering engine module 22 of the content of display data 30. The full-power mode rendering of the content of display data 30 may appear similar to user interface 14A of FIG. 1 and, with presentation properties 32 applied to the rendered content, may be compatible with the display characteristics of UID 12 when UID 12 operates in full-power mode.

While operating in full-power mode, computing device 10 may determine that a user is not interacting with computing device 10 and transition from operating in full-power mode to a low-power mode. For example, computing device 10 may operate in low-power mode in which computing device 10 may provide limited-power to, and/or may operate with some of the functionality provided by, processors 40, input devices 42, communication units 44, output devices 46, and UID 12. In some examples, computing device 10 may utilize a more capable, full-power one of processors 40 in full-power mode and may utilize a less capable, low-power one of processors 40 in low-power mode.

In some examples, while operating in full-power mode, UI module 20 of computing device 10 may determine that an activity timer associated with computing device 10 has lapsed and in response to the expired activity timer, computing device 10 may transition from full-power mode and low-power mode (e.g., computing device 10 may transition from using a full-power one of processors 40 to a low-power one of processors 40).

In some examples, while operating in full-power mode, UI module 20 of computing device 10 may receive an indication of an input detected at an input device (e.g., UID 12) that causes computing device 10 to transition from full-power mode to low-power mode and the change in the power mode of computing device 10 may be detected in response to receiving the indication of the input. For instance, a user of computing device 10 may provide a gesture at UID 12 to place computing device 10 in sleep mode. Responsive to receiving the gesture, computing device 10 may transition from operating in full-power mode to operating in low-power mode and UI module 20 may receive an indication, from processors 40, of the transition or otherwise detect the change from one power mode to another.

Responsive to detecting the change from full-power to low-power mode, UI module 20 may cause rendering engine module 22 to produce an updated rendering of the content of display data 30 that may appear similar to user interface 14B of FIG. 1 and, with presentation properties 32 applied to the rendered content, may be compatible with the display characteristics of UID 12 when UID 12 operates in low-power mode.

In producing a rendering of the content of display data 30 for UI module 20 in response to the change in power mode of computing device 10, rendering engine module 22 may identify, from among a set of elements that each specify respective content in in display data 30, one or more elements that each have at least one respective attribute associated with the low-power mode of computing device 10. For example, rendering engine module 22 may parse display data 30 to identify specific elements (e.g., HTML <DIV> tags), that bound portions of the content of display data 30 and are associated with the current (e.g., low-power) mode of computing device 10.

Rendering engine module 22 may modify, based on the change to the power mode of computing device 10, at least a portion of the respective attribute of each of the identified one or more elements to associate the respective content of display data 30 specified by each of the identified elements with a set of presentation characteristics stored at presentation properties 32. For example, display data 30 may be HTML-based display data that references one or more CSS in presentation properties 32. Rendering engine module 22 may modify the portions of content in display data 30 that have attributes indicative of low-power mode by associating the portions of the content with the set of presentation characteristics in presentation properties 32 that are associated with the low-power mode. Rendering engine module 22 may generate a rendering of the modified display data 30, which includes the portions of content indicated by the attributes indicative of the low-power mode. UI module 20 may cause UID 12 to present the rendering of the modified display data 30 which may appear similar to user interface 14B of FIG. 1.

Figure 3:
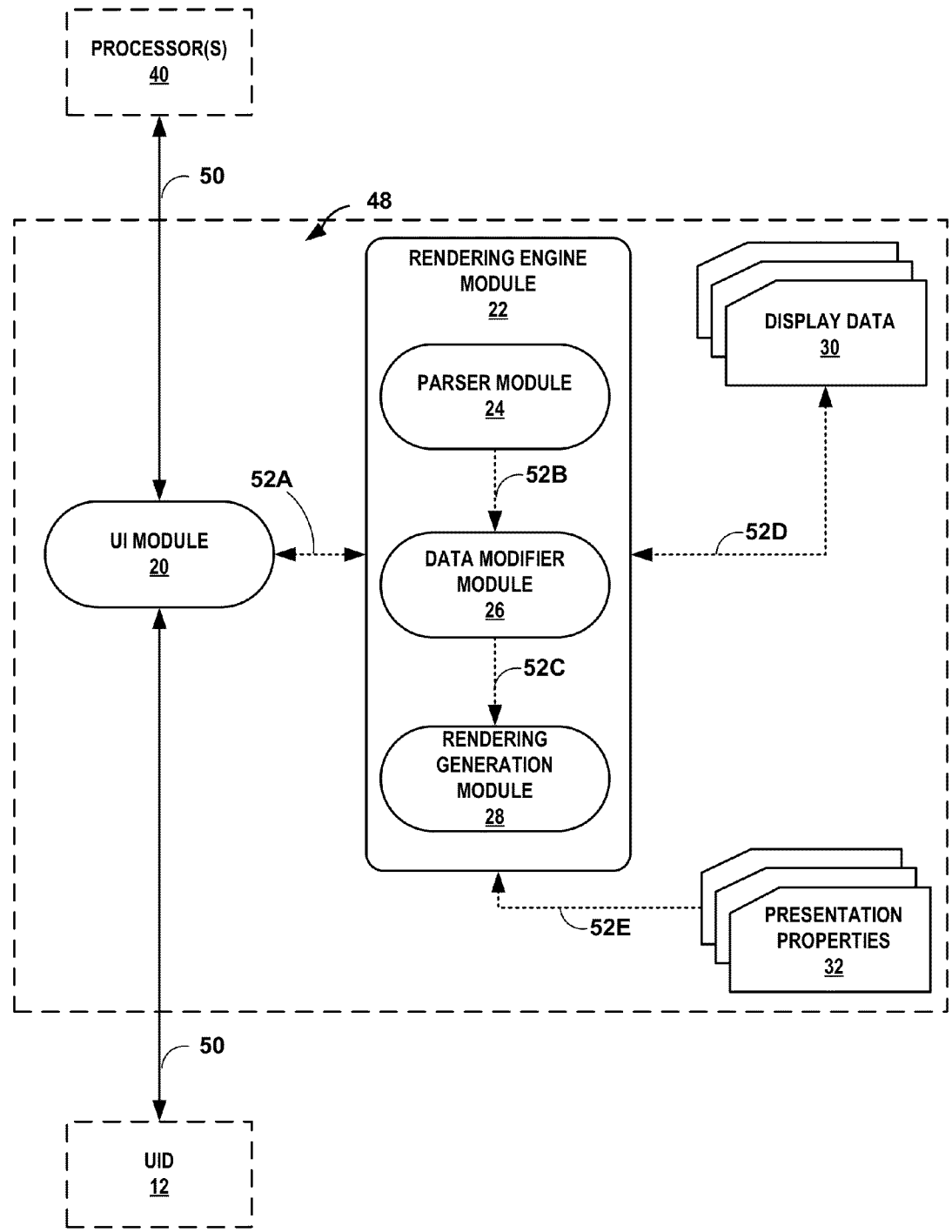
FIG. 3 is a block diagram illustrating a more detailed view of portions of the example computing device illustrated in FIG. 2.

FIG. 3 is a block diagram illustrating a more detailed view of portions of the example computing device illustrated in FIG. 2. FIG. 3 is described within the context of computing device 10 of FIGS. 1 and 2. For instance, similar to computing device 10 of FIG. 2, FIG. 3 shows one or more processors 40, storage devices 48, and UID 12 all linked by communication channels 50. Rendering engine module 22 of FIG. 3 includes parser module 24, data modifier module 26, and rendering generation module 28 as subcomponents for performing the operations of rendering engine module 22. UI module 20, rendering engine module 22, parser module 24, data modifier module 26, rendering generation module 28, display data 30, and presentation properties 32 are linked via logical data paths 52A-52E (collectively "data paths 52"). Each of data paths 52 represents a one-way or two-way logical connection between modules 20, 22, 24, 26, and 28, as well as display data 30 and presentation properties 32. For instance, data path 52A may facilitate the two-way communication of data between UI module 20 and rendering engine module 22. Data path 52B and data path 52C may facilitate the one-way communication of data between modules 24 and 26 and modules 26 and 28 respectively. Data path 52D may facilitate the two-way communication of data between rendering engine module 22 and display data 30, and data path 52E may facilitate the one-way communication of data from presentation properties 32 and rendering generation module 28.

Parser module 24 may perform operations on behalf of rendering engine module 22 related to parsing display data 30 to identify one or more elements in display data 30 that have attributes associated with the current power mode of computing device 10. For instance, parser module 24 may be a script that performs read operations over data path 52D to parses HTML-based display data at display data 30 to identify one or more elements that have attributes associated with a full-power mode and/or a low-power mode of computing device 10. The below HTML pseudo code represents an example of portions of HTML-based display data that have portions of content associated with a low-power mode and a full-power mode of computing device 10.

```
<div class="showWhenOff">
Package from retailer
</div>
<div class="showWhenOff header">
arrived
</div>
<div class="timestamp">
5 hours ago
</div>
```

In this example, the class identifiers "showWhenOff" and "showWhenOff header" represent attributes of "div" elements that mark portions of content bounded by the respective "div" elements with the low-power mode of computing device 10. The class identifier "timestamp" represents an attribute of "div" elements that mark portions of content bounded by the respective "div" elements with a different power mode (e.g., a full-power mode) of computing device 10.

When UI module 20 detects processors 40 changing from operating in full-power mode to low-power mode (or low-power mode to full-power mode), parser module 24 may perform a read operation over data path 52D to read display data 30 and to search display data 30 for one or more elements (e.g., "<div>" and "</div>" tags) that have class identifiers with the attributes "showWhenOff" and/or "showWhenOff header" to identify those elements that bound portions of content that are associated with the low-power mode of computing device 10.

Data modifier module 26 may receive an indication of the one or more elements identified by parser module 24 and modify at least a portion of the respective attribute of each of the identified one or more elements to associate the respective content specified or bounded by each of the one or more identified elements with a set of presentation properties, such as presentation properties 32. For example, data modifier module 26 may, prior to any rendering of display data 30, perform write operations on display data 30 utilizing data path 52D to change the attributes "showWhenOff" and/or "showWhenOff header" to an attribute associated with a power mode specific portion of presentation properties 32. For instance, when operating in low-power mode, data modifier module 26 may rewrite display data 30 to change the attributes "showWhenOff" and/or "showWhenOff header" to the attribute "lowPower" within the text-based, tag formatted content represented by display data 30 to mark those portions of display data 30 that are bounded by the one or more identified elements with a portion of presentation properties 32 (e.g., a CSS) that are associated with the low-power mode of computing device 10.

Rendering generation module 28 may receive an indication from data modifier module 26 of the current power mode of computing device 10 over data path 52C and perform read operations via data paths 52D and 52E as rendering generation module 28 generates a rendering, based on the current power mode, of portions of content of display data 30 in accordance with the power-mode specific set of presentation properties 32. For example, the modifications performed by data modifier module 26 of display data 30 may cause rendering generation module 28 to produce a rendering of the content of display data 30 by applying power-mode specific display characteristics (e.g., portions of presentation properties 32, such as one or more CSS) to portions of display data 30 such that when UI module 20 causes UID 12 to present the rendering of display data 30, only the portions of content of display data 30 that are associated with the current power mode are displayed and further, the displayed content has the presentation characteristics that are compatible with UID 12 when UID 12 operates in the current power mode.

UI module 20 may receive, over communication channels 50 from processors 40, an indication of a detected change to a power mode of computing device 10 that causes UI module 20 to initiate operations for updating the presentation of a user interface at UID 12. For instance, UI module 20 may determine that processors 40 have transitioned from operating in a full-power mode to a low-power mode.

Responsive to receiving the indication of the detected change, UI module 20 may cause rendering module 22 to provide an updated rendering of a user interface that is compatible with the display characteristics of UID 12 when computing device 10 operates in the current power mode, in this example, a low-power mode. For instance, UI module 20 may request an updated rendering of display data 30 to cause UID 12 to present user interface 14B in place of interface 14A.

Rendering engine module 22 may invoke parser module 24 to identify, from among a set of elements (e.g., "<div>" and "</div>" tags) that each specify respective content in accordance with a markup language (e.g., HTML), one or more elements (e.g., "<div>" and "</div>" tags) that each have at least one respective attribute associated with the power mode of the computing device. For instance, parser module 24 may search for and identify those elements that have a class attribute "showWhenOff" and/or "showWhenOff header".

Rendering engine module 22 may invoke data modifier module 26 to cause data modifier module 26 to modify, based on the change to the power mode, at least a portion of the respective attribute of each of the identified one or more elements to associate the respective content specified by each of the identified elements with a set of presentation properties (e.g., CSS). For example, data modifier module 26 may change class attributes of each of the identified elements from "showWhenOff" and/or "showWhenOff header" to "low-Power" to associate those attributes with the low-power mode of computing device 10.

Rendering engine module 22 may invoke rendering generation module 28 to cause rendering generation module 28 to render, for display in accordance with the set of presentation properties, the respective content specified by each element from the set of elements. For instance, rendering generation module 28 may perform HTML-based rendering operations on display data 30, which reference CSS of presentation properties 32, to produce a rendering of the content of display data 30 in accordance with one or more CSS of presentation properties 32 to cause the portions of content to be compatible with the display characteristics of UID 12 when UID 12 operates in low-power mode.

In some examples, data modifier module 26 of computing device 10 may modify at least a portion of the respective attribute of each of the identified one or more elements identified by parser module 24 by adding a power mode identifier associated with the set of presentation properties to the respective attribute of each of the identified one or more elements. The power mode identifier indicates one of a set of low-power presentation properties and a set of full-power presentation properties. In other words, data modifier module 26 may perform write operations on display data 30 utilizing data path 52D to change the attributes "showWhenOff" and/or "showWhenOff header" to an attribute associated with a power mode specific portion of presentation properties 32.

In some examples, data modifier module 26 of computing device 10 may add a power mode identifier by inserting the power mode identifier as a class identifier within each of the elements that have the attribute associated with the power mode. In some examples, the class identifier may specify a class defined by a cascaded style sheet and the class may specify the set of presentation properties.

For example, when computing device 10 changes from operating in a full-power mode to operating in a low-power mode, data modifier module 26 may add the attribute "low-Power" to the identified elements that have a class identifier attribute of "showWhenOff" and/or "showWhenOff header" to mark those portions of display data 30 that are bounded by the identified elements with a CSS of presentation properties 32 that includes presentation characteristics that are specific to low-power mode. By adding the attribute "lowPower", data modifier module 26 may replace the attribute of "showWhenOff" and/or "showWhenOff header" or in some examples, may add the attribute "lowPower" in addition to the attribute of "showWhenOff" and/or "showWhenOff header". When the computing device 10 changes from operating in a low-power mode to operating in a full-power mode, data modifier module 26 may add a "fullPower" attribute to, and/or may remove the "lowPower" attribute from, the identified elements that have a class identifier attribute of "showWhenOff" and/or "showWhenOff header" to mark those portions of display data 30 that are bounded by the identified elements with a CSS of presentation properties 32 that includes presentation characteristics that are specific to full-power mode and/or otherwise not specific to low-power mode.

By adding the attribute "lowPower" or "fullPower" to one or more elements of display data 30, data modifier module 26 may be specifying a portion of presentation properties 32 (e.g., a class defined by a cascaded style sheet that may specify the set of presentation properties) that rendering generation module 28 applies to the content of display data 30 that is bounded by the one or more elements when rendering generation module 28 produces a rendering of display data 30. In other words, rendering generation module 28 may render the respective content of display data 30 which is specified by each of the identified elements according to the set of presentation properties indicated by the power mode identifier added, by data modifier module 26, to the respective attribute.

Figure 4:
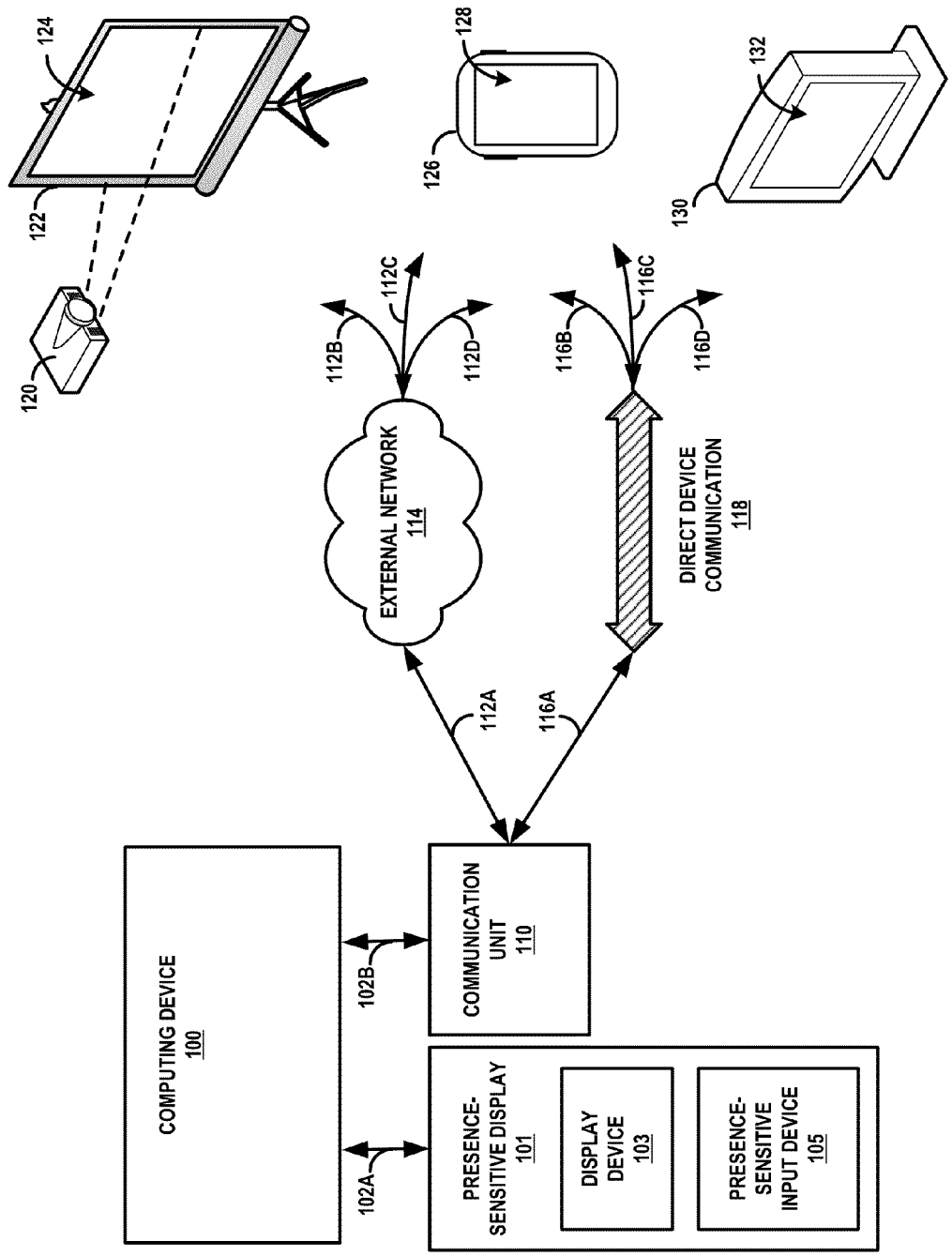
FIG. 4 is a block diagram illustrating an example computing device that outputs graphical content for display at a remote device, in accordance with one or more techniques of the present disclosure.

FIG. 4 is a block diagram illustrating computing device 100 that outputs graphical content for display at a remote device, in accordance with one or more techniques of the present disclosure. Graphical content, generally, may include any visual information that may be output for display, such as text, images, a group of moving images, a rendering of content of HTML-based display data, etc. The example shown in FIG. 4 includes a computing device 100, presence-sensitive display 101, communication unit 110, projector 120, projector screen 122, mobile device 126, and visual display device 130. Although shown for purposes of example in FIGS. 1 and 2 as a stand-alone computing device 10, a computing device such as computing devices 10, 100 may, generally, be any component or system that includes a processor or other suitable computing environment for executing software instructions and, for example, need not include a presence-sensitive display.

As shown in the example of FIG. 4, computing device 100 may be a processor that includes functionality as described with respect to processors 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 4, computing device 100 may be operatively coupled to presence-sensitive display 101 and communication unit 110 by any number of one or more communication channels.

In other examples, such as illustrated previously by computing device 10 in FIGS. 1-3, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 4, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 4 for purposes of brevity and illustration.

FIG. 4 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UID 12 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 4 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, computerized watches, computerized eyeglasses, etc. Examples of visual display device 130 may include other semi-stationary devices such as televisions, computer monitors, etc. As shown in FIG. 4, mobile device 126 may include a presence-sensitive display 128. Visual display device 130 may include a presence-sensitive display 132. Presence-sensitive displays 128, 132 may include a subset of functionality or all of the functionality of UID 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 4 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 4. In some examples, network links 112A-112D may be Ethernet, ATM or other network connections. Such connections may be wireless and/or wired connections.

In some examples, computing device 100 may be operatively coupled to one or more of the remote devices included in FIG. 4 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 4 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

Computing device 100 may be operatively coupled to visual display device 130 using external network 114. Computing device 100 may detect a change to a power mode of the computing device. For example, computing device 100 may transition from operating in a full-power mode to operating in a low-power mode in response to determining a lapse in a sleep timer that indicates to computing device 100 that computing device 100 is not currently in use.

Responsive to detecting the change, computing device 100 may identify, from among a set of elements that each specify respective content in accordance with a markup language, one or more elements that each have at least one respective attribute associated with the power mode of computing device 100. For example, computing device 100 may parse HTML-based display data, that computing device 100 uses as a rendering source for a graphical user interface, for one or more elements that bound portions of content of the HTML-based display data to identify those elements that have attributes (e.g., a class identifier) associated with the current (e.g., low-power) mode of computing device 100.

Computing device 100 may modify, based on the change to the power mode, at least a portion of the respective attribute of each of the identified one or more elements to associate the respective content specified by each of the identified elements with a set of presentation properties. For example, computing device 100 may adding a low-power mode identifier that indicates a set of low-power presentation properties and is defined by a cascaded style sheet to the respective attribute of each of the identified one or more elements in the HTML-based display data.

Computing device 100 may render, for display in accordance with the set of presentation properties, the respective content specified by each element from the set of elements. For example, computing device 100 may perform rendering operations on the modified HTML-based display data to produce a rendering (e.g., an image file) that computing device 100 can output for display. In producing the rendering, computing device 100 may apply the set of presentation properties indicated by the power mode identifier that was added to the respective attribute of the HTML-based display data and defined in a CSS. Computing device 100 may output, for display, an indication of the rendered respective content. For example, computing device 100 may send the rendering of the HTML-based display data to visual display device 130 over external network 114. Based on the data received over external network 114, visual display device may output for display, a graphical indication of the rendered respective content.

Figure 5A:
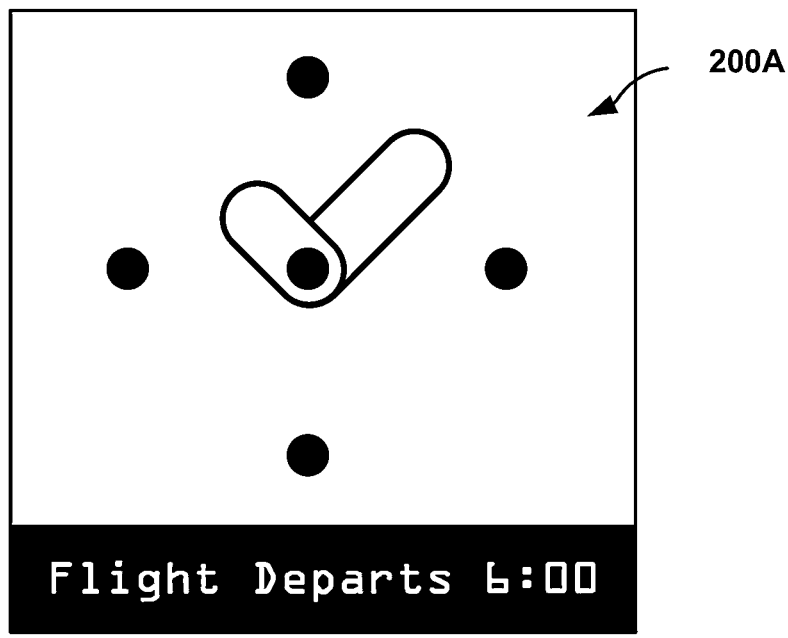
FIGS. 5A and 5B are conceptual diagrams illustrating example graphical user interfaces based on dynamically modified content, in accordance with one or more aspects of the present disclosure.
Figure 5B:
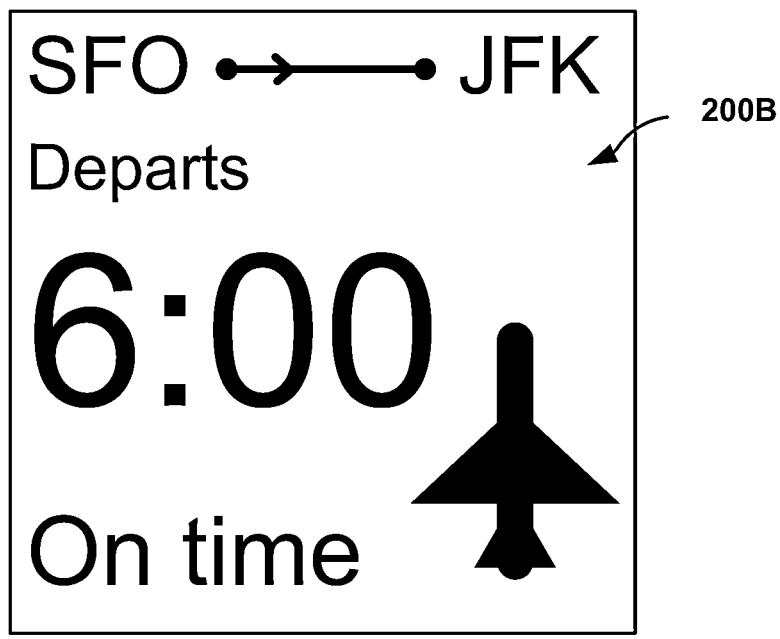

FIGS. 5A and 5B are conceptual diagrams illustrating example graphical user interfaces 200A and 200B which are based on dynamically modified content, in accordance with one or more aspects of the present disclosure. Computing device 10 of FIGS. 1 and 2 may render each of user interfaces 200A and 200B from HTML-based display data and cause UID 12 to output the rendering for display of each of user interfaces 200A and 200B at UID 12. FIGS. 5A and 5B are described below within the context of computing device 10 of FIGS. 1 and 2.

Computing device 10 may operate in a low-power mode and cause UID 12 to present user interface 200A which includes limited content being presented with less than maximum display characteristics. Response to detecting an input at UID 12 as a user of computing device 10 taps at a screen to "wake up" computing device 10 out of a sleep mode, UI module 20 may detect a change to a power mode of computing device 10. UI module 20 may determine that computing device 10 is transitioning from operating in low-power mode to operating in full-power mode. Responsive to detecting the change, UI module 20 may cause rendering engine module 22 to identify, from among a set of elements that each specify respective content in accordance with a markup language (e.g., from display data 30), one or more elements that each have at least one respective attribute associated with the power mode of the computing device.

Rendering engine module 22 may identify those one or more elements that have an attribute associated with the full-power mode of computing device 10. In some instances, rendering engine module 22 may identify those one or more elements that have an attribute associated with a current power mode of computing device 10 by identifying those one or more elements that have an attribute associated with the last power mode (e.g., the power mode of computing device 10 prior to detecting the change). In other words, rendering engine module 22 may identify those one or more elements that have an attribute associated with the low-power mode of computing device 10 to identify which attributes to modify and dis-associate from having presentation characteristics that are applicable for low-power mode and rather, have presentation characteristics that are compatible with the current full-power mode.

Rendering engine module 22 may modify, based on the change to the power mode, at least a portion of the respective attribute of each of the identified one or more elements to associate the respective content specified by each of the identified elements with a set of presentation properties. For example, rendering engine module 22 may identify each of the one or more elements that have a class identifier attribute "lowPower" and remove the class identifier attribute "lowPower" from display data 30 to disassociate the respective portions of content of display data 30 from having low-power mode presentation characteristics defined by one or more portions (e.g., CSS) of presentation properties 32.

Computing device 10 may render, for display in accordance with the set of presentation properties, the respective content specified by each element from the set of elements. For example, after removing the "lowPower" class identifier, rendering engine module 22 may render the HTML-based display data 30 by applying a CSS associated with full-power mode to produce an image file that UI module 20 can cause UID 12 to present as user interface 200B. User interface 200B includes more content than user interface 200A and the content of user interface 200B is presented at UID 12 with maximum display characteristics.

Figure 6:
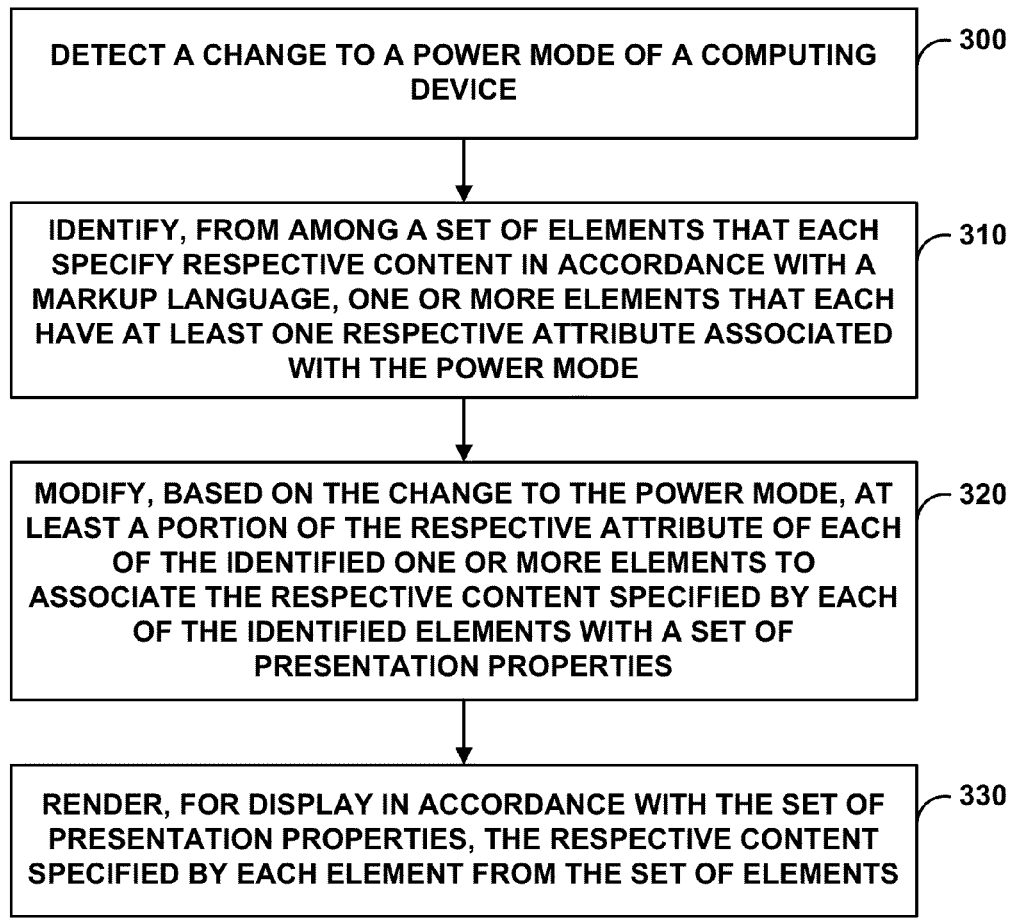
FIG. 6 is a flowchart illustrating example operations of an example computing device configured to dynamically modify content in response to a change to a power mode, in accordance with one or more aspects of the present disclosure.

FIG. 6 is a flowchart illustrating example operations of computing device 10 which is configured to dynamically modify content in response to a change to a power mode, in accordance with one or more aspects of the present disclosure. The process of FIG. 6 may be performed by one or more processors of a computing device, such as computing device 10 and computing device 100 illustrated in FIG. 1, FIG. 2, FIG. 3, and FIG. 4. For purposes of illustration, FIG. 6 is described below within the context of computing devices 10 of FIG. 1.

Computing device 10 may detect a change to a power mode of a computing device (300). For instance, UI module 20 may detect a change in power mode as computing device 10 transitions from operating in a one power mode to operating in a different power mode. The indication may be indicative of a change from low power mode to full power mode and the indication may be indicative of a change from full power mode to low power mode. The change may be detected in response to input received from a user (e.g., detected at UID 12) or, as another example, in response to computing device 10 determining to automatically transition from one mode to another mode (e.g., in response to an activity timer expiring, or in response to receiving information, such as a notification, an alert, etc. that causes computing device 10 to transition from operating in one power mode to another power mode).

Computing device 10 may identify, from among a set of elements that each specify respective content in accordance with a markup language, one or more elements that each have at least one respective attribute associated with the power mode (310). For example, rendering engine module 22 may parse HTML-based display data that computing device 10 uses to generate a user interface that computing device 10 presents at UID 12. Rendering engine module 22 may search for one or more elements of the HTML-based display data to identify those elements that have a class attribute (e.g., "showWhenOff") associated with the low-power mode of computing device 10.

Computing device 10 may modify, based on the change to the power mode, at least a portion of the respective attribute of each of the identified one or more elements to associate the respective content specified by each of the identified elements with a set of presentation properties (320). For instance, rendering engine module 22 may insert an attribute associated with the low-power mode of computing device 10 (e.g., "low- Power") to mark those portions of content of the HTML-based display data which are bounded by the identified elements to associate those portions of content with a set of presentation properties (e.g., a CSS) which is associated with the low-power mode of computing device 10.

Computing device 10 may render, for display in accordance with the set of presentation properties, the respective content specified by each element from the set of elements (330). For example, rendering engine module 22 may perform rendering operations on the HTML-based display data to produce a rendered image of the content of the HTML-based display data. Rendering engine module 22 may apply a set of presentation properties associated with the low-power mode of computing device 10 to those portions of content of the HTML-based display that have the "lowPower" attribute. In this way, only the portions of content of the HTML-based display data that should be presented in low-power mode show up in the rendering and at UID 12 when UI module 20 causes computing device 10 to output the rendering for display. In addition, the content included in the rendering has presentation characteristics that are compatible with UID 12 when UID 12 is being operated in low-power mode.

Clause 1. A method, comprising: detecting, by a computing device, a change to a power mode of the computing device; responsive to detecting the change, identifying, by the computing device and from among a set of elements that each specify respective content in accordance with a markup language, one or more elements that each have at least one respective attribute associated with the power mode of the computing device; modifying, by the computing device and based on the change to the power mode, at least a portion of the respective attribute of each of the identified one or more elements to associate the respective content specified by each of the identified elements with a set of presentation properties; and rendering, by the computing device and for display in accordance with the set of presentation properties, the respective content specified by each element from the set of elements.

Clause 2. The method of any of clauses 1-2, wherein modifying the at least a portion of the respective attribute of each of the identified one or more elements comprises: adding, by the computing device, a power mode identifier associated with the set of presentation properties to the respective attribute of each of the identified one or more elements, wherein the power mode identifier indicates one of a set of low-power presentation properties and a set of full-power presentation properties.

Clause 3. The method of clause 2, wherein adding a power mode identifier comprises inserting, by the computing device, the power mode identifier as a class identifier within each of the elements having the attribute associated with the power mode.

Clause 4. The method of clause 3, wherein the class identifier specifies a class defined by a cascaded style sheets, wherein the class specifies the set of presentation properties.

Clause 5. The method of any of clauses 2-4, wherein rendering the respective content comprises: rendering, by the computing device, the respective content specified by each of the identified elements according to the set of presentation properties indicated by the power mode identifier added to the respective attribute.

Clause 6. The method of any of clauses 1-5, wherein the change is detected in response to the computing device transitioning from a full-power mode to a low-power mode.

Clause 7. The method of any of clauses 1-6, further comprising: responsive to determining that an activity timer associated with the computing device has lapsed, transitioning, by the computing device, to a sleep mode associated with the computing device, wherein the change is detected in response to the transition to the sleep mode.

Clause 8. The method of any of clauses 1-7, further comprising: outputting, by the computing device and for display, a graphical indication of the rendered respective content.

Clause 9. The method of any of clauses 1-8, further comprising: receiving, by the computing device, an indication of an input detected at an input device, wherein the change is detected in response to receiving the indication of the input.

Clause 10. The method of any of clauses 1-9, wherein the set of elements each specify respective content in accordance with hypertext markup language, and wherein the set of presentation properties are defined by one or more cascaded style sheets.

Clause 11. A computing device comprising: at least one processor; and at least one module operable by the at least one processor to: detect a change to a power mode of the computing device; responsive to detecting the change, identify, from among a set of elements that each specify respective content in accordance with a markup language, one or more elements that each have at least one respective attribute associated with the power mode of the computing device; modify, based on the change to the power mode, at least a portion of the respective attribute of each of the identified one or more elements to associate the respective content specified by each of the identified elements with a set of presentation properties; and render, for display in accordance with the set of presentation properties, the respective content specified by each element from the set of elements.

Clause 12. The computing device of clause 11, wherein the at least one module is further operable by the at least on processor to modify the at least a portion of the respective attribute of each of the identified one or more elements by at least adding a power mode identifier associated with the set of presentation properties to the respective attribute of each of the identified one or more elements, wherein the power mode identifier indicates one of a set of low-power presentation properties and a set of full-power presentation properties.

Clause 13. The computing device of clause 12, wherein the at least one module is further operable by the at least on processor to add the power mode identifier by at least inserting the power mode identifier as a class identifier within each of the elements having the attribute associated with the power mode.

Clause 14. The computing device of any of clauses 11-13, further comprising an input device, wherein the at least one module is further operable by the at least one processor to: receive an indication of an input detected at the input device; and responsive to receiving the indication of the input, detect the change.

Clause 15. The computing device of any of clauses 11-14, wherein the at least one module is further operable by the at least one processor to output, for display at a display device, a graphical indication of the rendered respective content.

Clause 16. A computer-readable storage medium encoded with instructions that, when executed, cause at least one processor of a computing device to: detect a change to a power mode of the computing device; responsive to detecting the change, identify, from among a set of elements that each specify respective content in accordance with a markup language, one or more elements that each have at least one respective attribute associated with the power mode of the computing device; modify, based on the change to the power mode, at least a portion of the respective attribute of each of the identified one or more elements to associate the respective content specified by each of the identified elements with a set of presentation properties; and render, for display in accordance with the set of presentation properties, the respective content specified by each element from the set of elements.

Clause 17. The computer-readable storage medium of clause 16, wherein the instructions for modifying the at least a portion of the respective attribute of each of the identified one or more elements comprises instructions, that when executed, cause the at least one processor to add a power mode identifier associated with the set of presentation properties to the respective attribute of each of the identified one or more elements, wherein the power mode identifier indicates one of a set of low-power presentation properties and a set of full-power presentation properties.

Clause 18. The computer-readable storage medium of clause 17, wherein the instructions for rendering the respective content comprises instructions, that when executed, cause the at least one processor to render the respective content specified by each of the identified elements according to the set of presentation properties indicated by the power mode identifier added to the respective attribute.

Clause 19. The computer-readable storage medium of any of clauses 16-18, being further encoded with instructions that, when executed, cause the at least one processor of the computing device to output, for display, a graphical indication of the rendered respective content.

Clause 20. The computer-readable storage medium of any of clauses 16-19, being further encoded with instructions that, when executed, cause the at least one processor of the computing device to receive an indication of an input detected at an input device, wherein the change is detected in response to receiving the indication of the input.

Clause 21. The device of clause 11, further comprising means for performing any of the methods of clauses 1-10.

Clause 22. A computer-readable storage medium encoded with instructions for causing one or more programmable processors to perform the method recited by any of clauses 1-10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   detecting, by a computing device, a change to a power mode of the computing device;
   responsive to detecting the change to the power mode, processing, by the computing device and from among a set of elements within a page of content that each specify a respective portion of the content in accordance with a markup language, the page of content to identify one or more elements of the set of elements that each have at least one respective attribute designated to be modified in response to the change to the power mode;
   modifying, by the computing device and based on the change to the power mode, at least a portion of the at least one respective attribute of each of the identified one or more elements to associate the respective portion of the content specified by each of the identified one or more elements with a set of presentation properties; and
   rendering, by the computing device and for display in accordance with the set of presentation properties, the respective portion of the content specified by each of the identified one or more elements.

2. The method of claim 1, wherein modifying the at least a portion of the at least one respective attribute of each of the identified one or more elements comprises:
   adding, by the computing device, a power mode identifier associated with the set of presentation properties to the at least one respective attribute of each of the identified one or more elements, wherein the power mode identifier indicates one of a set of low-power presentation properties and a set of full-power presentation properties.

3. The method of claim 2, wherein adding a power mode identifier comprises inserting, by the computing device, the power mode identifier as a class identifier within each of the identified one or more elements.

4. The method of claim 3, wherein the class identifier specifies a class defined by a cascaded style sheets, wherein the class specifies the set of presentation properties.

5. The method of claim 2, wherein rendering the respective portion of the content comprises:
rendering, by the computing device, the respective portion of the content specified by each of the identified one or more elements according to the set of presentation properties indicated by the power mode identifier added to the at least one respective attribute.

6. The method of claim 1, wherein the change to the power mode is detected in response to the computing device transitioning from a full-power mode to a low-power mode.

7. The method of claim 1, further comprising:
responsive to determining that an activity timer associated with the computing device has lapsed, transitioning, by the computing device, to a sleep mode associated with the computing device, wherein the change to the power mode is detected in response to the transition to the sleep mode.

8. The method of claim 1, further comprising:
outputting, by the computing device and for display, a graphical indication of the rendered respective portion of the content.

9. The method of claim 1, further comprising:
receiving, by the computing device, an indication of an input detected at an input device, wherein the change to the power mode is detected in response to receiving the indication of the input.

10. The method of claim 1, wherein the set of elements each specify respective content in accordance with hypertext markup language, and wherein the set of presentation properties are defined by one or more cascaded style sheets.

11. A computing device comprising:
at least one processor; and
at least one module operable by the at least one processor to:
detect a change to a power mode of the computing device;
responsive to detecting the change to the power mode, process, from among a set of elements within a page of content that each specify a respective portion of the content in accordance with a markup language, the page of content to identify one or more elements of the set of elements that each have at least one respective attribute designated to be modified in response to the change to the power mode;
modify, based on the change to the power mode, at least a portion of the at least one respective attribute of each of the identified one or more elements to associate the respective portion of the content specified by each of the identified one or more elements with a set of presentation properties; and
render, for display in accordance with the set of presentation properties, the respective portion of the content specified by each of the identified one or more elements.

12. The computing device of claim 11, wherein the at least one module is further operable by the at least on processor to modify the at least a portion of the at least one respective attribute of each of the identified one or more elements by at least adding a power mode identifier associated with the set of presentation properties to the at least one respective attribute of each of the identified one or more elements, wherein the power mode identifier indicates one of a set of low-power presentation properties and a set of full-power presentation properties.

13. The computing device of claim 12, wherein the at least one module is further operable by the at least on processor to add the power mode identifier by at least inserting the power mode identifier as a class identifier within each of the identified one or more elements.

14. The computing device of claim 11, further comprising an input device, wherein the at least one module is further operable by the at least one processor to:
receive an indication of an input detected at the input device; and
responsive to receiving the indication of the input, detect the change to the power mode.

15. The computing device of claim 11, wherein the at least one module is further operable by the at least one processor to output, for display at a display device, a graphical indication of the rendered respective portion of the content.

16. A computer-readable storage medium encoded with instructions that, when executed, cause at least one processor of a computing device to:
detect a change to a power mode of the computing device;
responsive to detecting the change to the power mode, process, from among a set of elements within a page of content that each specify a respective portion of the content in accordance with a markup language, the page of content to identify one or more elements of the set of elements that each have at least one respective attribute designated to be modified in response to the change to the power mode;
modify, based on the change to the power mode, at least a portion of the at least one respective attribute of each of the identified one or more elements to associate the respective portion of the content specified by each of the identified one or more elements with a set of presentation properties; and
render, for display in accordance with the set of presentation properties, the respective portion of the content specified by each of the identified one or more elements.

17. The computer-readable storage medium of claim 16, wherein the instructions for modifying the at least a portion of the at least one respective attribute of each of the identified one or more elements comprises instructions, that when executed, cause the at least one processor to add a power mode identifier associated with the set of presentation properties to the at least one respective attribute of each of the identified one or more elements, wherein the power mode identifier indicates one of a set of low-power presentation properties and a set of full-power presentation properties.

18. The computer-readable storage medium of claim 17, wherein the instructions for rendering the respective content comprises instructions, that when executed, cause the at least one processor to render the respective content specified by each of the identified one or more elements according to the set of presentation properties indicated by the power mode identifier added to the at least one respective attribute.

19. The computer-readable storage medium of claim 16, being further encoded with instructions that, when executed, cause the at least one processor of the computing device to output, for display, a graphical indication of the rendered respective portion of the content.

20. The computer-readable storage medium of claim 16, being further encoded with instructions that, when executed, cause the at least one processor of the computing device to receive an indication of an input detected at an input device, wherein the change to the power mode is detected in response to receiving the indication of the input.

* * * * *